United States Patent
Rune (10) Patent No.: US 11,178,585 B2
(45) Date of Patent: Nov. 16, 2021

(54) BEAM SELECTION BASED ON UE POSITION MEASUREMENTS

(71) Applicant: Telefonaktiebolaget LM Ericsson (publ), Stockholm (SE)

(72) Inventor: Johan Rune, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 188 days.

(21) Appl. No.: 16/068,149

(22) PCT Filed: Jan. 6, 2016

(86) PCT No.: PCT/EP2016/050118
§ 371 (c)(1),
(2) Date: Jul. 5, 2018

(87) PCT Pub. No.: WO2017/118479
PCT Pub. Date: Jul. 13, 2017

(65) Prior Publication Data
US 2019/0014510 A1 Jan. 10, 2019

(51) Int. Cl.
*H04W 36/00* (2009.01)
*H04B 7/06* (2006.01)
(Continued)

(52) U.S. Cl.
CPC ...... *H04W 36/0055* (2013.01); *H04B 7/0408* (2013.01); *H04B 7/0617* (2013.01);
(Continued)

(58) Field of Classification Search
CPC ... H04W 36/32; H04W 36/245; H04W 64/00; H04W 36/0055; H04W 36/06;
(Continued)

(56) References Cited

U.S. PATENT DOCUMENTS

| | | | | |
|---|---|---|---|---|
| 2002/0187782 A1* | 12/2002 | Spratt | ............ | G01S 5/0009 455/435.1 |
| 2009/0088156 A1* | 4/2009 | Aaron | ............ | H04W 36/32 455/436 |

(Continued)

FOREIGN PATENT DOCUMENTS

| | | |
|---|---|---|
| CN | 103945393 A | 7/2014 |
| CN | 104380140 A | 2/2015 |

(Continued)

OTHER PUBLICATIONS

First Chinese Office Action for Chinese Patent Application No. CN 201680083260.7 dated Sep. 1, 2020, 19 pages (including English translation).

*Primary Examiner* — Margaret G Mastrodonato
(74) *Attorney, Agent, or Firm* — Sage Patent Group (57) ABSTRACT

The invention refers to a method for performing a handover of a user equipment, UE (10), from one or a plurality of source beams of a source access node, AN (14) to one or a plurality of target beams of a target access node, AN (16), wherein the target AN performs the steps of receiving from the source AN (14) a positioning information indicative of a first position estimate of an actual position of the UE (10), determining or initiating determining a resulting position estimate, wherein the resulting position estimate is derived from the first position estimate, and activating the one or the plurality of target beams in dependency of the resulting position estimate. The invention further refers to a method wherein the target AN (16) performs the steps of receiving from the source AN the positioning information indicative of a first position estimate, determining or initiating determining a second position estimate associated to the an actual position of the UE (10), determining or initiating determining a delta position between the first position estimate and the second position estimate, and storing or initiating storing (Continued)

the delta position. The invention further refers to a method wherein the source AN (14) performs the steps of determining or initiating determining a first position estimate of an actual position of the UE (10), and sending to the target AN (16) an information indicative of the first position estimate of an actual position of the UE (10). The invention further refers to corresponding access nodes (14, 16) and a software program.

10 Claims, 6 Drawing Sheets

(51) Int. Cl.
*H04B 7/0408* (2017.01)
*H04W 36/32* (2009.01)
*H04W 36/08* (2009.01)
*H04W 64/00* (2009.01)
*H04W 36/06* (2009.01)

(52) U.S. Cl.
CPC ........... *H04W 36/08* (2013.01); *H04W 36/32* (2013.01); *H04W 64/00* (2013.01); *H04W 36/06* (2013.01)

(58) Field of Classification Search
CPC ... H04W 36/08; H04B 7/0617; H04B 7/0408; H04B 7/0834
See application file for complete search history.

(56) References Cited

U.S. PATENT DOCUMENTS

| | | | | |
|---|---|---|---|---|
| 2013/0337822 | A1* | 12/2013 | Rubin | H04L 1/0026 455/452.1 |
| 2015/0230263 | A1* | 8/2015 | Roy | H04W 64/00 455/452.2 |
| 2016/0047884 | A1* | 2/2016 | Zhang | G01S 5/0284 342/458 |
| 2016/0165340 | A1* | 6/2016 | Benattar | H04R 29/006 381/92 |

FOREIGN PATENT DOCUMENTS

| | | |
|---|---|---|
| CN | 105052199 A | 11/2015 |
| GB | 2511860 A | 9/2014 |
| JP | 2001169325 A | 6/2001 |
| WO | 2006105316 A2 | 10/2006 |
| WO | 2014036150 A1 | 3/2014 |

* cited by examiner

BEAM SELECTION BASED ON UE POSITION MEASUREMENTS

TECHNICAL FIELD

The present disclosure generally relates to beam forming in a radio access network, and further to inter access node beam handover.

BACKGROUND

In a typical cellular system, also referred to as a wireless communications network, wireless terminals, also known as mobile stations or user equipments communicate via a Radio Access Network, RAN, to one or more core networks. The radio access network may comprise a plurality of access points, AP, or base stations, BS that communicate with the user equipments, UEs, by means of radio signals and provide access to the core network.

The Third Generation Partnership Project, 3GPP, has established a plurality of generations of mobile communication standards. The Universal Mobile Telecommunications System, UMTS, is a third generation mobile communication system, which evolved from the Global System for Mobile Communications, GSM, to provide mobile communication services based on Wideband Code Division Multiple Access, WCDMA, access technology. Long-Term Evolution, LTE, often being referred to as fourth generation, has been specified to increase the capacity and speed using orthogonal frequency division multiplexing, OFDM, in the downlink and Discrete Fourier Transform (DFT)-spread OFDM, also being referred to as single-carrier frequency-division multiple access (SC-FDMA) in the uplink.

With the ever increasing demands to increase the traffic volume and to reduce the latency, so-called fifth generation (5G) systems are currently been specified by 3GPP. Important aspects of 5G are to densify the network, and to use more spectrum. Additional available frequencies for next generation (5G) networks that are practically usable are located in very high frequency ranges (compared to the frequencies that have so far been used for wireless communication), such as 10 GHz and above.

For such high frequency spectrum, the atmospheric, penetration and diffraction attenuation properties are much worse than for lower frequency spectrum. In addition, the receiver antenna aperture, as a metric describing the effective receiver antenna area that collects the electromagnetic energy from an incoming electromagnetic wave, is frequency dependent, i.e., the link budget would be worse for the same link distance even in a free space scenario, if omnidirectional receive and transmit antennas are used. This motivates the usage of beamforming to compensate for the loss of link budget in high frequency spectrum. Beamforming may be used at the transmitter, at the receiver, or both. In a large part of the spectrum planned for 5G deployments the preferred configuration is to use a large antenna array at the access node (AN) and a small number of antennas at the UE. The large antenna array at the AN enables high-order transmit beamforming in the downlink.

The beamforming capability of an access node may range from a set of discrete directions (with fixed beam width) to full flexibility in terms of direction and shape (i.e. any direction and more or less arbitrary shape). Likewise, the ability to form and transmit (and/or receive) simultaneous beams may range from a single beam at a time to more or less any number of simultaneous beams. These differences in capabilities are results of choice of beamforming implementation (where complexity and cost may be aspects of trade-off) and dimensioning of the access node's hardware.

Similar to the handover of a UE from one cell (eNB) to another in legacy (e.g. 4G) cell based wireless communication networks, utilizing beamforming requires to hand over a UE to another beam and/or access node, when its current beam can no longer provide the coverage the UE needs.

In beamforming based 5G systems a significant difference from legacy cell based handovers is that it is envisioned that the beams in 5G will not always be active, but will rather be activated on demand when a UE needs it. In conjunction with a potential handover from another beam, the potential target beam(s) therefor have to be activated (and reference signals have to be transmitted) so that the UE can measure the channel quality (e.g. by so-called Reference Signal Received Power, RSRP, measurements) of the candidate target beam(s).

A consequence is that a UE cannot autonomously identify a suitable target beam through measurements, but beams to be measured have to be activated before.

As the actual location of a UE might not be exactly known, or in other words, any measurement or estimation of the UE location has a certain uncertainty, one task is to activate possible target beams, especially for the case of an inter-access node handover (i.e. a handover from one or a plurality of beams in the source AN to one or a plurality of beams in the target AN), where the best candidate target beam(s) is (are) expected to (or at least may) be transmitted from another AN.

Activating too many beams in the target may have some drawbacks: apart from wasting energy, rescores of the target AN may be inefficiently utilized, e.g. a target AN with limited beamforming capability may use an undesirably large portion of its beamforming capacity to provide measurement opportunities (instead of using the resources for data transmission to other UEs). More beams also means that a larger number of unique reference signals are needed, which makes it more difficult to design reference signals with good enough properties. The time required for the measurement procedure will also increase with the number of beams to measure on. As the measurement procedure may take longer time, the risk of handover failures and/or other potential disturbances in the UE's communication may increase due to long measurement gaps. On the other hand, activating too few beams may lead to a suboptimal beam selection (resulting in suboptimal performance) and even to handover failures.

SUMMARY

It is thus desired to activating an appropriate number of candidate target beam(s).

According to an embodiment, a method performs a handover of a user equipment, UE, from one or a plurality of source beams of a source access node, AN, to one or a plurality of target beams of a target AN, wherein one or the plurality of target beams are activated in dependency of a position estimate of the source AN.

According to an embodiment thereto, the target AN may perform the following steps:
  receiving from the source AN a positioning information indicative of a first position estimate of an actual position of the UE,
  determining or initiating determining a resulting position estimate, wherein the resulting position estimate is derived from the first position estimate, and activating the one or the plurality of target beams in dependency of the resulting position estimate.

According to a further embodiment, a method for supporting the handover of the UE may comprise the following steps:

receiving from the source AN a positioning information indicative of a first position estimate associated to an actual position of the UE, at the target AN, determining or initiating determining a second position estimate associated to the an actual position of the UE, determining a position difference vector between the first position estimate and the second position estimate, and determining a delta position as a function of the position difference vector.

According to a further embodiment, the source AN may support the target AN by transmitting a position information indicative of an actual position of the UE. Thereto, the source AN may determine or initiate determining a first position estimate and transmit a corresponding information to the target AN, so that the target AN is enabled to activating the one or the plurality of target beams in dependency of the first position estimate According to a further embodiment, the target AN comprises:

a receiver adapted for receiving from a the source AN a positioning information indicative of a first position estimate of an actual position of the UE, a determining module adapted for determining a resulting position estimate, wherein the resulting position estimate is derived from the first position estimate, and an activation module adapted for activating one or a plurality of target beams in dependency of the resulting position estimate.

According to a further embodiment, the target AN alternatively or additionally comprises:

a position estimation module adapted for determining a second position estimate associated to the an actual position of the UE, and a determining module adapted for determining a position difference vector between the first position estimate and the second position estimate, and for determining a delta position as a function of the position difference vector.

According to a further embodiment, the source AN comprises:

a position estimation module adapted for determining a first position estimate of an actual position of the UE, and an information transmission module adapted for sending to the target AN (an information indicative of the first position estimate of an actual position of the UE, so that the target AN is enabled to activating one or the plurality of target beams in dependency of the first position estimate.

According to a further embodiment, a computer program comprises instructions being stored in a memory of an access node (source AN or target AN) which, when executed on at least one processor of the access node, cause the at least one processor to carry out or support any of the afore described embodiments.

In the following, detailed embodiments of the present invention shall be described in order to give the skilled person a full and complete understanding. However, these embodiments are illustrative and not intended to be limiting.

BRIEF DESCRIPTION OF THE DRAWINGS

The accompanying drawings illustrate several aspects of the disclosure, and together with the description serve to explain the principles of the disclosure.

DESCRIPTION

Figure 1:
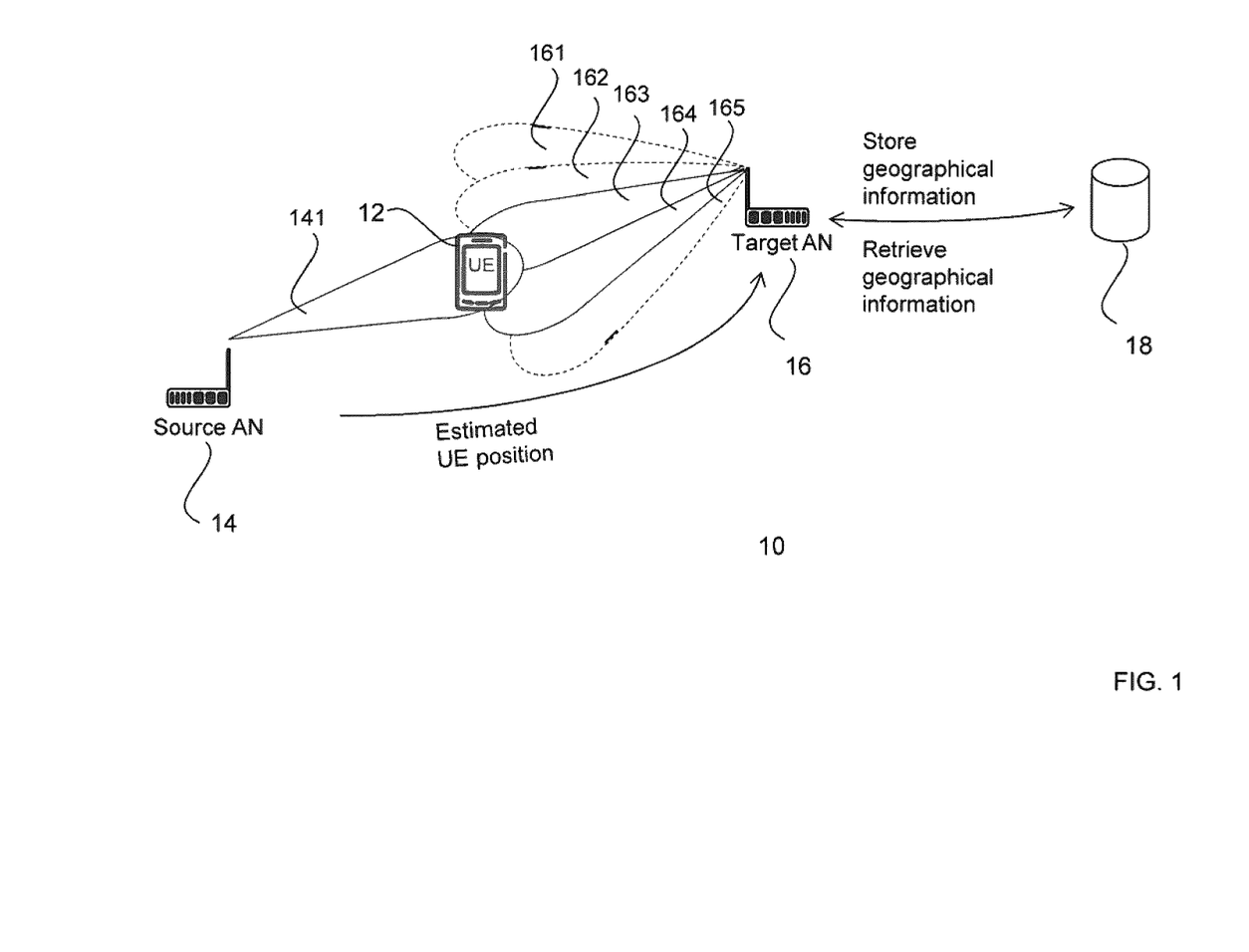
FIG. 1 illustrates a radio network comprising access nodes involved in a handover with respect to a wireless device.

As shown in FIG. 1 the example radio network 10 may include one or more instances of wireless communication devices (e.g. conventional user equipments (UE), or machine type communication (MTC) or machine-to-machine (M2M) equipments) and a plurality of radio access nodes (e.g. eNodeBs or other base stations) capable of communicating with the wireless communication devices along with any additional elements suitable to support communication between wireless communication devices or between a wireless communication device and another communication device (such as a landline telephone or a server on the Internet). In the example of FIG. 1, one of the wireless communication devices is shown that will be referred to as user equipment, UE, 12. Further, a first access node, AN, 14, in the following also being referred to as source AN 14 (where the UE 10 is connected to before a handover) and a second AN 16, in the following also being referred to as target AN 16 (where the UE 10 is connected to after the handover) are shown by example.

Figure 5:
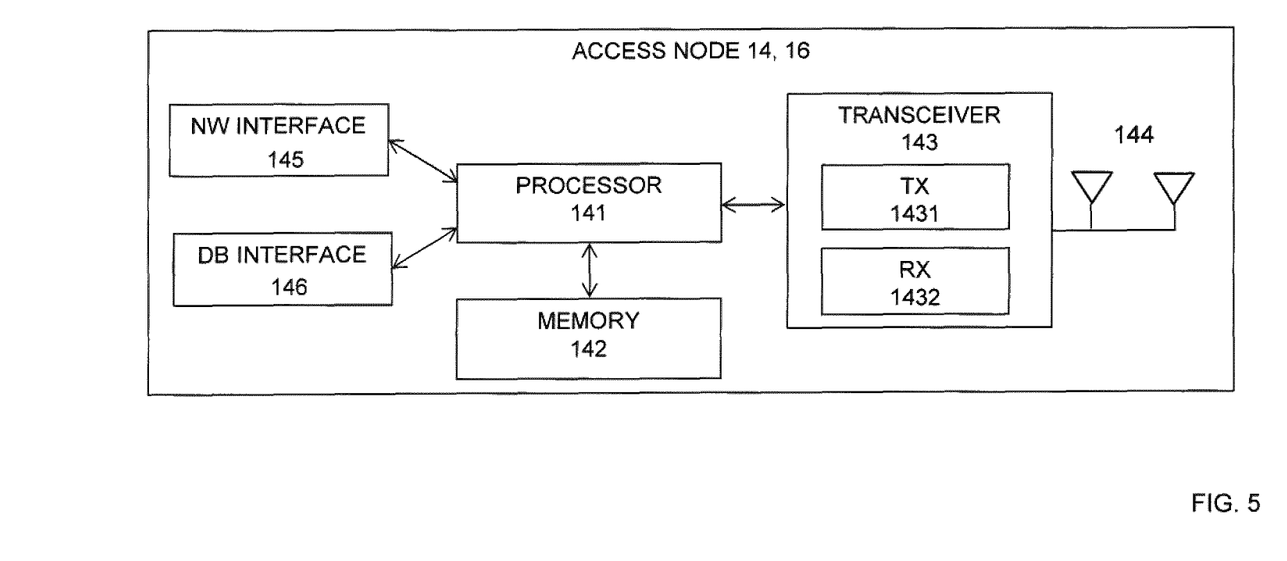
FIG. 5 is a first block diagram showing exemplary structural units of access nodes according to some embodiments of the present disclosure.

Although the illustrated access nodes may represent network nodes that include any suitable combination of hardware and/or software, these nodes may, in particular embodiments, represent devices such as the example radio access node illustrated in greater detail by FIG. 5. It should be understood that the network 10 may include any number of access nodes serving any number of wireless communication devices. The access nodes 14 and/or 16 may be further connected to a controlling node in the radio access network and/or to the core network (not shown).

In the example of FIG. 1, the source AN 14 communicates to the UE 12 by means of one exemplary source beam 141. The UE 12 may be actually located at the edge of the source beam 141 of the source AN 14. In such situation, a handover from the source AN 14 to the target AN 14 may be triggered e.g. by the source AN 14, if this node detects that the UE gets out of range of the active beam 141 and/or of any further beams of the source AN 14 or if the channel quality has deteriorated to an unsatisfactory level and/or the UE is in risk of soon moving outside the coverage area of the source beam and/or of any further beams of the source AN 14. As part of a handover procedure, the source AN 14 may send a position information message comprising an estimated UE position to the target AN 16. Further, a position database 18 is shown that may store information received from the target AN, and may further provide stored geographical information to the target AN. The position database 18 may be an integral part of the target AN, or a separate entity of the radio network 10.

Further, exemplary candidate target beams 161-165 associated to the target AN 16 providing radio connection to the UE 12 are shown. Based on the estimated UE position, as assessed by the source AN and transferred to the target AN, and on corresponding geographical information retrieved from the position database 18, the target AN 16 may activate a subset of the candidate beams 161-165, e.g. candidate beams 163 and 164 according to the example shown in FIG. 1, so that the UE may perform beam measurements, e.g. RSRP measurements of these beams as discussed above.

In the following, a position with respect to a geographic coordinate system will be referred to as (geographic) position. The position may be determined by means of a certain number of coordinates or dimensions, e.g. in 2 or 3 dimensions. A common choice of coordinates may e.g. be latitude, longitude and elevation.

Figure 2:
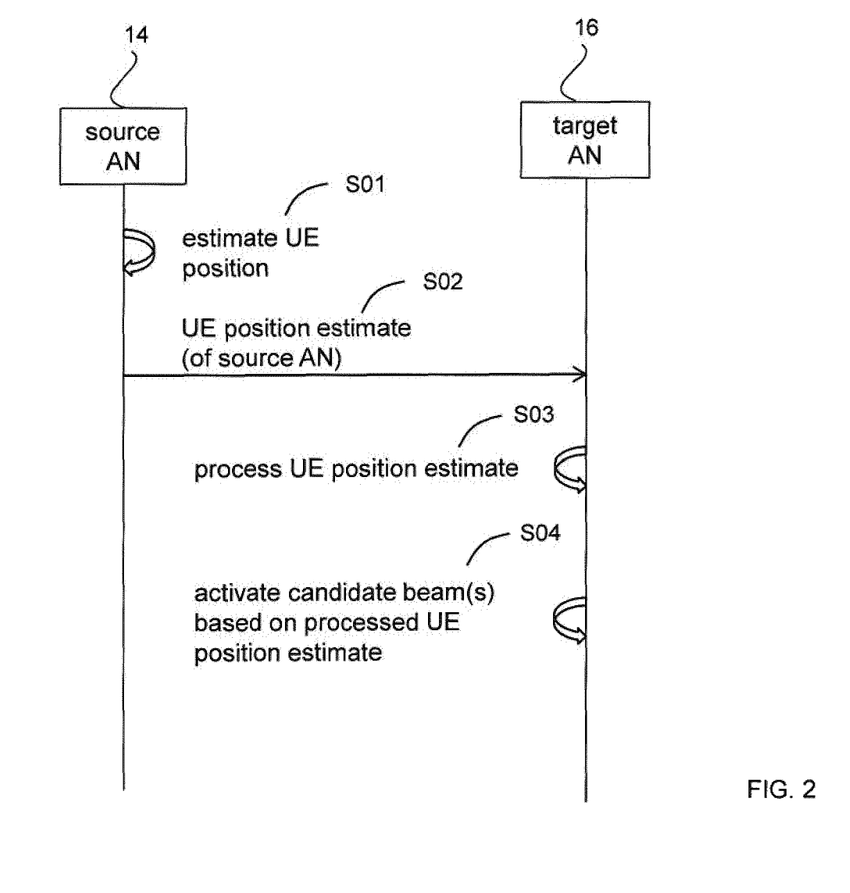
FIG. 2 illustrates a first sequence of steps performed by a source access node and a target access node involved in the handover, in order to activate one or a plurality of candidate beams in the target access node.

FIG. 2 shows exemplary messages sent between the source AN 14, the target AN 16 and the position database 18 and actions performed by these nodes during a handover.

In a first step S01, the source AN 14 determines a first position estimate of a UE to be handed over from one or a plurality of beams in the source AN 14 to one or a plurality of beams in the target AN 16.

In a second step S02, the source AN 14 transmits a position information message indicative of the first position estimate to the target AN 16.

In a third step S03, the target AN 16 initiates a processing of the position information message, e.g. to obtain a further (or corrected) position estimate.

In a fourth step S04, the target AN 16 performs a selection of one or a plurality of candidate beams to be activated in order to connect to the UE 10 based on the further position estimate.

In an embodiment, the further position estimate is determined as a function of the first position estimate. This may be performed by obtaining an adjustment or delta position and calculating the further position estimate as a function of the first position estimate and the delta position, e.g. by adding a vector representing the delta position to a vector representing the first position estimate. In an embodiment, the delta position is retrieved from the positon data base 18 shown in FIG. 1.

The determination of the position estimate in step S01 may be based on any known positioning method, e.g. based on a function of the antenna position (of a currently serving beam), an assumption of a line of sight to the UE, beam direction and/or angel of arrival measurements based on directional reciprocity assumption, and/or and signal time of arrival measurements and/or timing advance applied in the UE.

The position data base 18 may keep stored systematic position differences of the position estimations of the source AN 14 with respect to the target AN 16 (or in other words, discrepancies between the source AN's position map (reflected in the estimated positions conveyed to the target AN) and the target AN's position map reflecting the target AN's position estimates.

Figure 3:
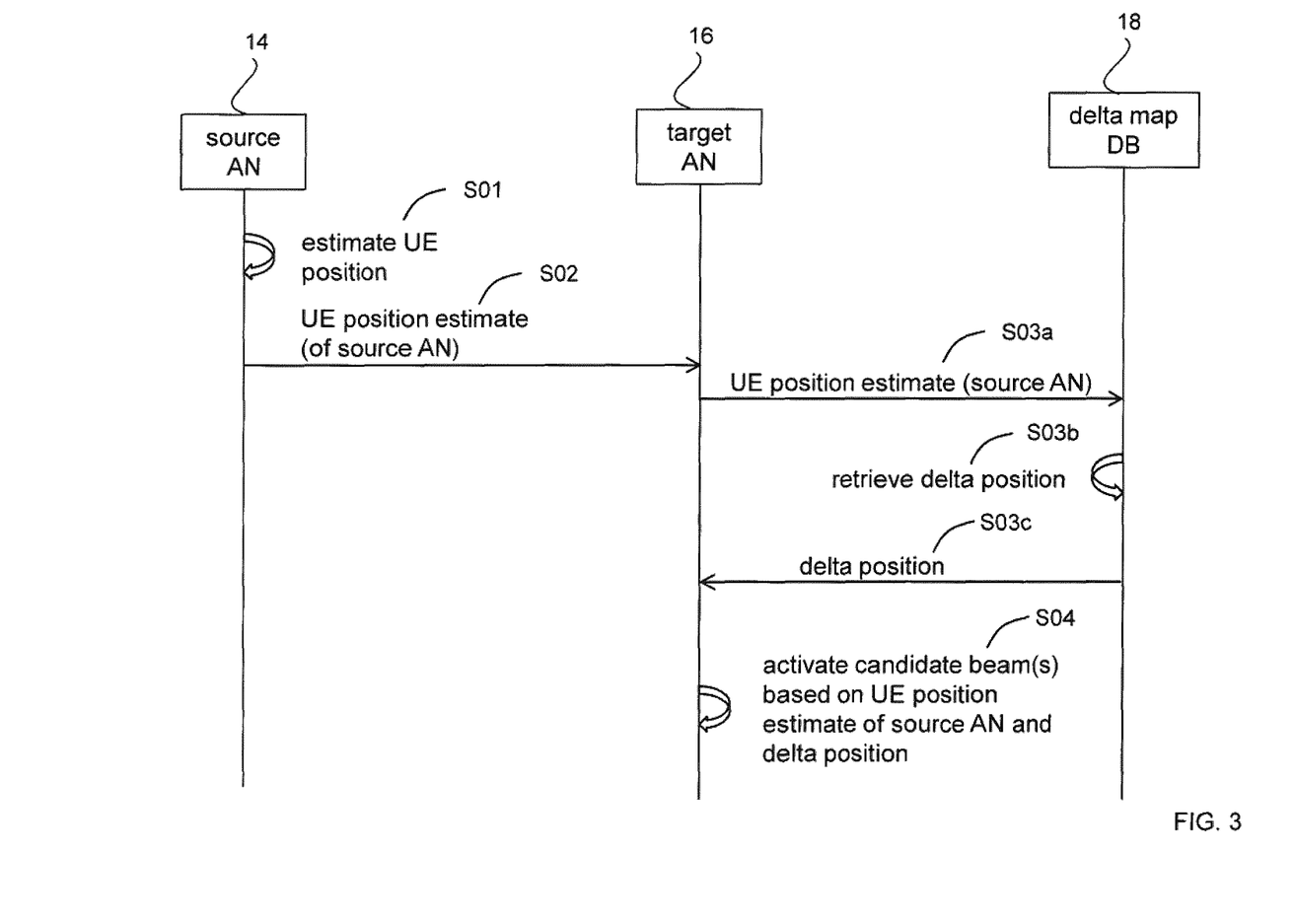
FIG. 3 illustrates a second sequence of steps performed by the source access node, the target access node and a position data base, in order to activate one or a plurality of candidate beams in the target access node.

FIG. 3 shows an embodiment involving the position data base 18 into the method described in FIG. 2. Steps S01, S02 and S04 are essentially similar to those of FIG. 2.

Third step S03 of FIG. 2 is replaced by new steps S03a, S03b, and S03c:

In step S03a, the target AN 16 transmits a request indicative of the estimated position received from the source AN 14 to the position database 18. This database may keep stored a plurality of delta position information (e.g. in form of delta vectors) each being associated to an estimated position (vector) determined by the source AN.

In step S03b, in response to the request, the database 18 retrieves the delta position as a function of an estimated position received from the source AN 14

In step S03c, the position data base 18 returns the delta position to the target AN 16.

As discussed above, the target AN 16 may calculate the adjusted or corrected position as a function of the estimated position determined by the source AN 14 and the received delta position, e.g. by determining a sum of the estimated position vector and the delta vector. In an alternative embodiment, the database 18, enhanced with processing means, may determine the adjusted or corrected position and return such information to the target AN 16.

In the following, the plurality of delta positions each associated to respective estimated positions of the source AN 14 will also be referred to as discrepancy or delta map (of the target AN 16 with respect to the source AN 14) that is kept stored by the position data base 18. The delta map and corresponding calculations may use any kind of coordinates, e.g. spherical coordinates, cylindrical coordinates or Cartesian coordinates. The source and the target AN may use the same reference point as origin of the coordinate system, e.g. the center of the earth, or may alternatively use different reference points each of its own, e.g. each the antenna position of the corresponding AN.

In an embodiment, the delta map is built up in a learning way, e.g. such that the target AN 16 performs or initiates for each position estimate received from the source AN 14 a correction calculation, based on the target AN's own estimate of the same UE position, to establish the delta map.

Figure 4:
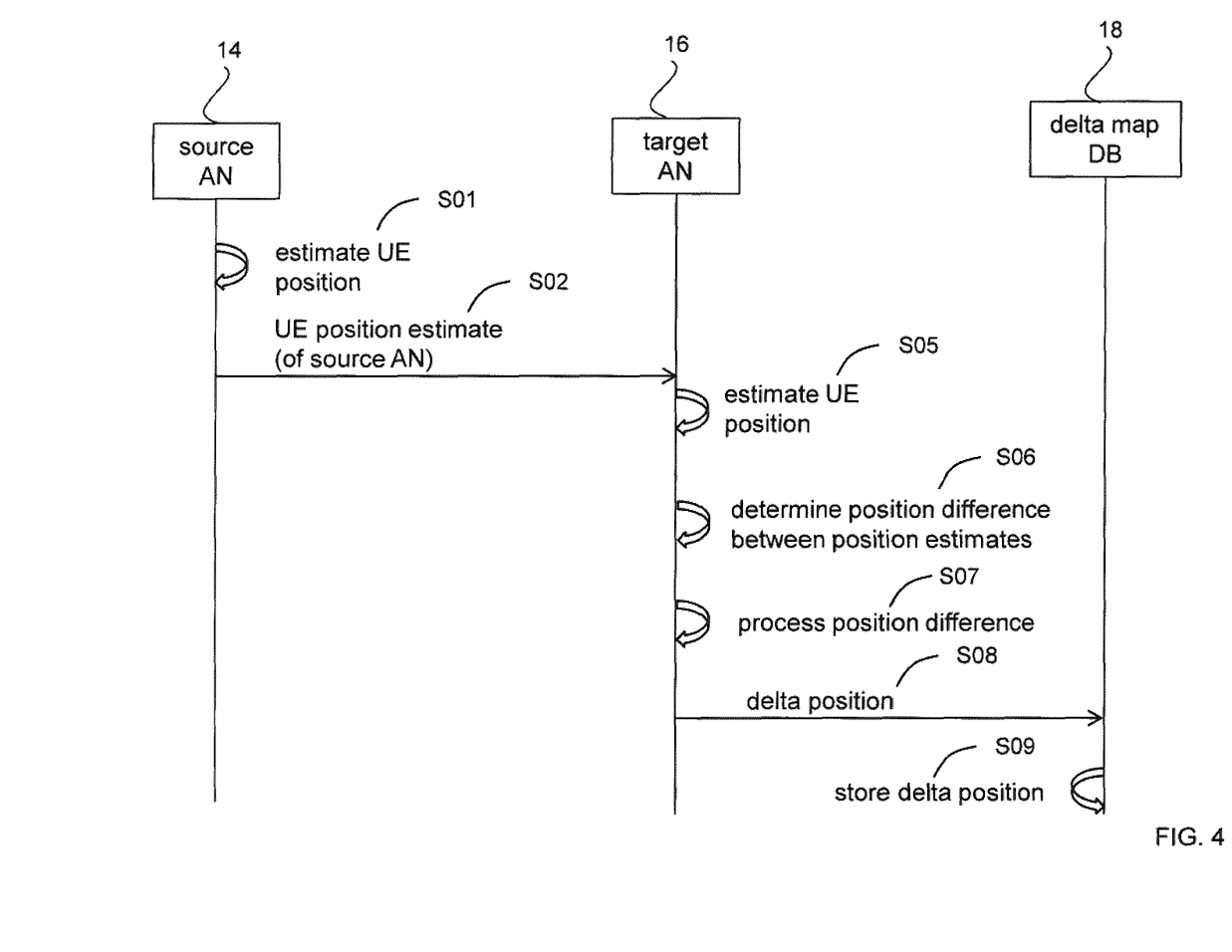
FIG. 4 illustrates a third sequence of steps performed by the source access node, the target access node and the position data base in order to store position data in the position data base.

FIG. 4 thereto shows the following exemplary steps:

Steps S01 and S02 are similar to those of previous FIG. 2 and FIG. 3.

In step S05, the target AN 16 performs an "own" position estimation (second position estimate) of the UE 10, e.g. using similar position estimation methods as used by the source AN 14.

In step S06, the target AN 16 determines a position difference between the first position estimate and the second position estimate.

The difference positions (between source AN position estimate and target AN position estimate) are then used to build-up the delta map.

In a simple solution, the position difference is being transmitted to the position data base to be stored as delta position (associated to the first or second position estimation).

In an embodiment, the position estimate from the source AN (first position estimate) is used as a key when interrogating the database to retrieve a delta vector for that source AN position estimate.

Additionally, the resulting position estimate (second position estimate) may be stored together with the position estimate from the source AN, so that the resulting position estimate is returned from the database when interrogated with the source AN position estimate; in this case instead of storing a discrepancy/delta vector, the first and second position estimate may be stored, wherein the delta vector may be calculated by the target AN.

In more elaborated embodiments, as depicted in step S07, the target AN 16 performs a processing to obtain the corresponding delta position. Such processing may comprise any of filtering, averaging and/or pruning of a plurality of determined position difference values to get (consolidated) delta positions, as being discussed below in more detail.

In step S08, the delta position is transmitted to the position data base 18 (together with any of the first or second position estimation).

In step S09, the position data base 18 stores the delta position together with one of the first or second position estimation.

Alternatively, the target AN 16 may convey the position difference (together with one of the first and second position estimate) or both the first and the second position estimate to the position data base 18 enhanced with processing means, that may then perform the processing and storing.

In the following embodiments, the delta map is established in a kind of self-learning manner, so to gradually establish the delta map. As discussed, each time a UE is being handed over, the target AN 16 determines a position difference that may be regarded as one sample of the position discrepancy or delta map.

If only one or a few difference position calculations have been performed with respect to one location (or location area), or if in other words the stored delta position is only based on one or a few measurements the target AN 16 many not put too much confidence into this value and thus activate beams to cover a rather large confidence area around the estimated position received from the source AN (or around the target AN's position adjustment calculation of the same nominal position), e.g. by activating greater plurality of narrow beams, or one or a smaller plurality of single wider beam(s). The more calculations have been performed for one delta position (e.g. the more samples that have been used), the more the target AN may trust in it and thus reduce the size of the confidence area, resulting in an activation of a fewer number of beams and/or narrower beam(s).

To build-up the delta map, two cases may be regarded. In a first case, the target AN 16 may receive another estimated UE position from the source AN 14 of the same nominal position (within a certain sub-space around the nominal position associated to a certain grid) (i.e. a nominal position for which it already has a sample in its database). In a second case, the target AN 16 may receive another estimated UE position from the source AN 14 of another nominal position (or outside the certain sub-space):

In the first case, the target AN 16 may use the sole sample (and associated delta vector) it has in its delta map and assume that this is roughly correct when choosing beam(s) to activate. However, since this delta vector is based only on a single sample, AN1 may not trust it too much, and may thus still activate one or a plurality of beams to cover a certain confidence area around the assumed position that may correspond to the received estimate position and a certain delta vector (but probably a slightly smaller area than after reception of the very first estimated UE position from the source AN). After UE detection the target AN 16 can determine its own estimation of the UE position, which may be compared with the one received from the source AN.

The target AN 16 will then have two difference position values (samples) to associate with the same position estimate received from the source AN 14. The target AN 16 may thus calculate a delta vector by means of averaging the samples to achieve a (consolidated) delta position to be stored in the delta map (such that for one nominal position estimate from the source AN there will only be one associated delta vector in the delta map). The average may be a weighted average, where the relative weights are based on the age of the old sample (in terms of time or, maybe more preferable, in terms of the number of subsequently received position estimates for the same nominal position), e.g. the older it is the less its weight will get in the calculation (e.g. like an exponential average).

In the second case, when choosing beam(s) to activate the target AN may use the sole sample (and associated delta vector) it has in its delta map and assume that this delta vector is roughly correct also when applied to the new UE position estimate received from the source AN. However, since this delta vector is based only on a single sample, and this sample is not even the same nominal position received from the source AN, the target AN may not trust it very much and will still activate beam(s) to cover a rather large confidence area around the assumed position (i.e. the received estimate+the delta vector). The larger the difference between the nominal position received from source AN and the one associated with the sample in the delta map, the less the delta vector may be trusted and the larger area should be covered. After UE detection, which allows the target AN to determine its own position estimate, this will result in a second sample in the delta map with a delta vector associated with a second sample position estimate from the source AN.

In this way, the target AN may continuously build up the delta map, which is refined with each sample received from the source AN. With an increasing refinement, the target AN may reduce the confidence area, resulting in activation of fewer beams.

In the following some further aspects with regard to determining a consolidated delta map based on received position estimate samples will be discussed:

When target AN 16 receives an estimated position from source AN 14, it compares the received position estimate with its delta map. In a case where a three dimension coordinate system is used, the target AN 16 may choose a certain space, e.g. a sphere, around the nominal received position estimate and identify all samples in the delta map that are located within this volume/sphere. From this set of samples the target AN 16 may calculate a (consolidated) delta vector to be applied to the received position estimate, to arrive at an improved position hypothesis or adjusted position.

The delta vector calculation may comprise determining a weighted average of position estimate samples (i.e. a weighted average of the delta vectors associated with these samples), wherein the nominal distance between the received position estimate and the nominal position of a sample in the delta map may determine the weight that is given to that sample (the longer the distance the smaller the weight). Therein a sample at the border of the sphere may get a small weight or even weight zero. Such a calculation may be performed per coordinate in the delta vectors.

It may be noted that this way of selecting candidate beam(s) assumes that the involved AN (in particular the target AN 16 in the above example) is capable of matching the adjusted position with one or more suitable beam(s) to cover the location. This knowledge may be built up through self-learning (utilizing UEs connected to the AN) or may be configured at deployment, and optionally in an embodiment, supported by drive tests.

In an embodiment, the samples in the delta map are associated to timestamps which may each represent a time of generation, reception or storage and may thus indicate the age of the sample.

In an embodiment, samples exceeding a certain age are replaced by new samples, thereby preventing the data base from growing excessively large. Thus, samples exceeding a certain age may be deleted or overwritten as soon a new sample is generated to be stored.

In an embodiment, the weight of a sample may be made dependent on the age of that sample such that the weight decreases with the age. This may be combined with the above described distance based weighting, i.e. such that the weight becomes a function of both age and distance.

Considering the age of the samples may be applied when learning and refining the delta map in the case where a received estimated position is similar to a sample in the map and/or when using the delta map to calculate a delta position to adjust a received position estimate. E.g. a weight assigned to a sample in a weighted average calculation may be based on a product of a factor derived from its nominal distance to the received position estimate and a factor derived from its age such that the older the sample and the longer the distance, the smaller the weight.

In an embodiment, the position space (e.g. two or three dimensional) is divided into a plurality of sub-spaces, e.g. according to a certain (two/three dimensional) grid. Thus, each three-dimensional sub-space may be regarded as one cube. In order to limit the size of the delta map, a maximum number of samples may be allowed for each sub-space. If a new sample of a certain position is to be stored, one of the previously stored samples is to be deleted or overwritten, if the number of preciously stored samples within this sub-space exceeds the allowed number. Such deleting/overwriting may also be based on the age of the stored samples; e.g. in case of deleting or overwriting, the oldest sample in the sub-space is removed from the delta map. Another example method aiming to limit the number of samples in the delta map could be to set a limit to the shortest allowed distance between two samples in the delta map, such that when a new sample is received, all samples (if any) that are nominally within a certain minimum distance from the new sample is/are removed from the delta map.

In the following a use of different position estimation techniques or systems within the source AN 14 and the target AN 16) will be regarded (in the following also being referred to as mixed positioning estimation techniques):

As mentioned above, the delta position information may reflect a systematic difference between the positioning estimation techniques or algorithms associated to a source AN 14 and a target AN 16. Some position determination systems described above have a limited accuracy. In order to improve the accuracy, the source AN may utilize a positioning system with higher accuracy for some UEs or in some situations. One such potential means would be to utilize a GPS receiver in the UE. Thus, the source AN 14 may use GPS data of a UE in case that it is available, and otherwise use a default (less accurate) position estimation technique. In order to build up a consistent delta map, the source AN 14 may send a (positioning estimation technique) indicator to the target AN 16 indicative of a positioning estimation technique used for the corresponding position estimate. Such an indication may be additionally stored in the data base 18 (wherein each indication is associated to each corresponding delta position).

In an embodiment, for the delta position estimation, it may be required that the same positioning technique is used for both the position estimation in the source AN 14 and for the position estimation in the potential target AN 16 (the AN receiving the position estimate). In other words, the target AN may not use samples associated to a different position technique (even if this technique may be more accurate). In another embodiment, different positioning techniques may be used by the source AN 14 and the target AN 16, provided that the same combination of positioning techniques is used when creating a sample in the delta map and when using it.

In an embodiment, above-mentioned positioning estimation technique indicator is further indicative of an (assumed) accuracy of the used positioning means. As an advantage of method, the format of the sample record in the delta map is completely forward compatible to (prepared for) an introduction of new positioning methods. Any existing or future positioning methods may be used, e.g. methods based on triangulation or satellite based positioning, e.g. GPS or any other Global Navigation Satellite System (GNSS), such as Galileo.

By way of example the indicator may be a one bit value, whereof a first value is indicative of a defined low accuracy and the second value is indicative of a defined high accuracy. Alternatively, there may be more than two accuracy levels used and indicated.

In an embodiment, the accuracy indicator may be used as a further input parameter to activate certain beams at the target AN 16. For instance, if the indicator indicates a positioning method of low accuracy, one or a plurality of beams covering a larger area may be selected than if the indicator indicates a positioning method of high accuracy.

In an embodiment, further information associated to the UE may be transmitted to the target AN 16, e.g. an indication of the current speed of the UE, an estimated transmit power, and/or service information (e.g. an importance of a seamless handover execution (e.g. based on a quality of service indication or a type of a service/application involved in the UE's current communication).

Any of the further information may be used as further input to activate certain beams at the target AN 16. As an example, the current speed may be used to determine an area to be covered by the beam(s) to be activated, wherein the size of the area may be dependent on the speed. In an example, the size of the area to be covered by the candidate beam(s) is a function of the positioning uncertainty and the speed (such that with an increasing positioning uncertainty and/or an increasing speed the size of the area around the estimated UE position may increase).

In the following, exemplary structural features of the access nodes 16 and 18 will be described in more detail.

As shown in FIG. 5, the access node (source AN 16 or target AN 18) includes a node processor 141, a node memory 142, a node transceiver 143, a plurality of node antennas 144, and a network interface 145 and a data base interface 146. The node processor 141 is coupled to the node memory 142, to the network interface 145, the data base interface 146, and to the node transceiver 143. The node transceiver 143 is further coupled to the one or the plurality of node antennas 144. The node transceiver 143 comprises a transmission circuit TX 1431 and a receiver circuit RX 1432. In particular embodiments, some or all of the functionality described above as being provided by the source AN or the target AN may be provided by the node processor 141 executing respective instructions stored on a computer-readable medium, such as the node memory 142. Alternative embodiments of the radio access node may include additional components responsible for providing additional functionality, including any of the functionality identified above and/or any functionality necessary to support the solution described above.

Figure 6A:
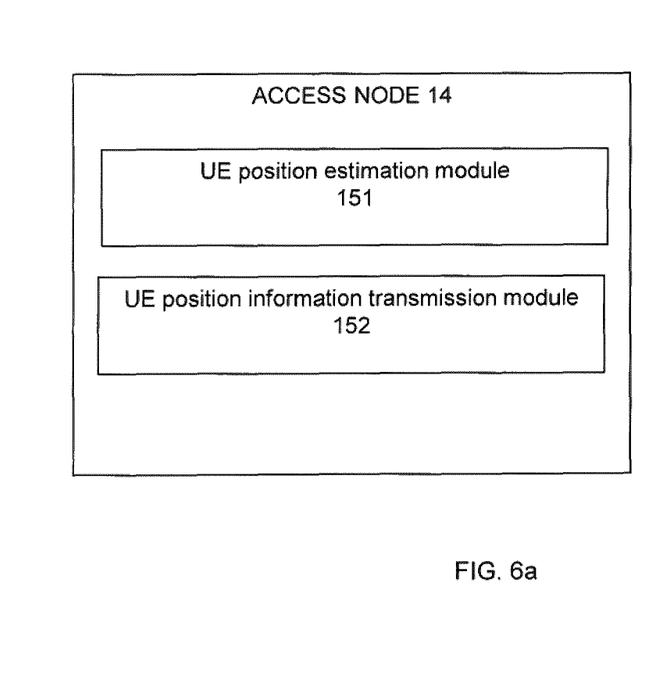
FIG. 6a is a second block diagram showing exemplary functional units of access nodes according to some embodiments of the present disclosure.

As shown in FIG. 6a, an example source AN 14 includes the following exemplary functional units:
- a UE position estimation module 151 to determine the first UE position estimate, wherein such estimation may be triggered by an inter AN handover (i.e. in a situation wherein the source AN decides to handover the UE 10 to a target AN 10, e.g. after evaluation signal strength measurements as discussed above), and
- a UE position information transmission module 152 capable to generate the UE position information based on the first UE position estimate and to transmit this information to the target AN.

Figure 6B:
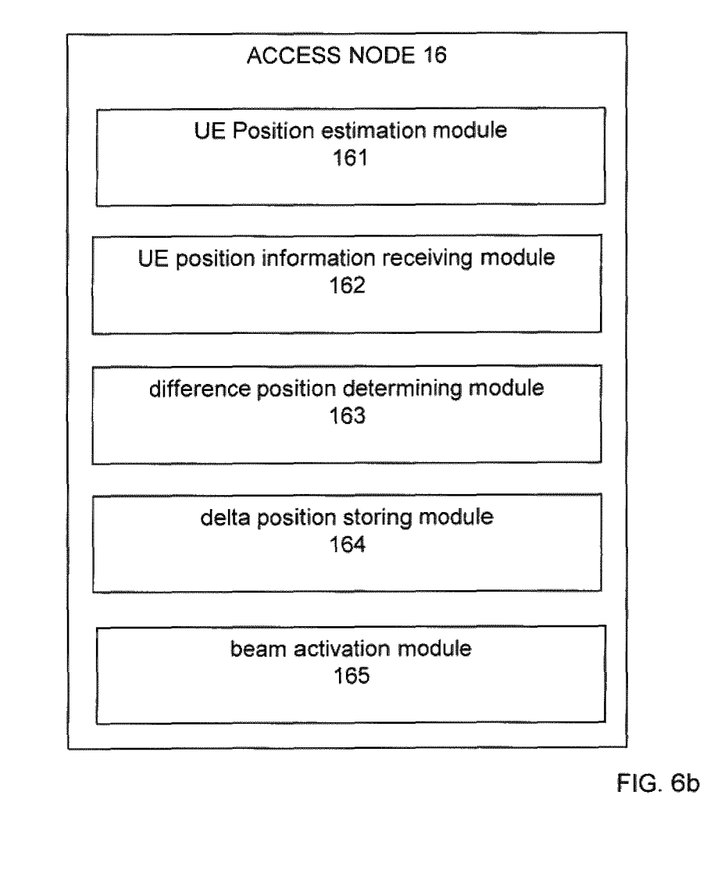
FIG. 6b is a third block diagram showing exemplary functional units of access nodes according to some embodiments of the present disclosure.

As shown in FIG. 6b, an example target AN 16 includes the following exemplary functional units:
- a UE position estimation module 161 to determine the second UE position estimate, wherein this module may be technically similar or different to the UE estimation module 151 of the source AN,
- a UE position information receiving module 162 capable to receive the position information and to retrieve the corresponding first position estimate,
- a difference/delta position determining module 163 for determining the difference between the first position estimate and the second position estimate to obtaining a delta position,
- a delta position storing module 164 to store or initiate storing a delta position (e.g. in aforementioned position data base 18), and
- a beam activation module 165 to select, as a function of any of the first position estimate, and the delta position estimate, one or a plurality of candidate beams to be activated with respect to the UE 10.

The delta position determining module 163 may comprise any of filtering, averaging weighting and/or pruning of a plurality of determined position difference values to get (consolidated) delta positions, as being discussed above.

The invention claimed is:

1. A method for performing a handover of a User Equipment (UE) from one or a plurality of source beams of a source Access Node (AN) to one or a plurality of target beams of a target AN, the method comprising the target AN:
receiving, from the source AN, positioning information indicative of a first position estimate of an actual position of the UE;
determining or initiating determining a resulting position estimate, wherein the resulting position estimate is derived from the first position estimate, wherein the resulting position estimate is a function of the first position estimate and a delta position associated to the first position estimate;
activating the one or the plurality of target beams based on the resulting position estimate,
wherein the delta position is determined based on pruning of a plurality of determined position difference values from a database that keeps the stored plurality of determined position difference values.

2. The method of claim 1, wherein the delta position estimate is retrieved from the database that keeps stored a delta position associated with the first position estimate.

3. The method of claim 1, wherein the function comprises calculating an average of a plurality of preceding delta positions.

4. A method of supporting a handover of a User Equipment (UE) from one or a plurality of source beams of a source Access Node (AN) to one or a plurality of target beams of a target AN, the method comprising the target AN:
receiving, from the source AN, positioning information indicative of a first position estimate associated to an actual position of the UE;
determining or initiating determining a second position estimate associated with the actual position of the UE, wherein the second position estimate is a function of the first position estimate and a delta position associated to the first position estimate; and
determining or initiating determining a delta position between the first position estimate and the second position estimate,
wherein the delta position is determined based on pruning of a plurality of determined position difference values from a database that keeps the stored plurality of determined position difference values; and
storing or initiating storing the delta position.

5. The method of claim 4, further comprising:
determining, after a subsequent handover, a subsequent delta position;
determining or initiating determining a refined delta position as a function of the stored delta position and the subsequent delta position; and
storing or initiating storing the refined delta position as delta position.

6. A method for performing a handover of a User Equipment (UE) from one or a plurality of source beams of a source Access Node (AN) to one or a plurality of target beams of a target AN, the method comprising the source AN:
determining or initiating determining a first position estimate of an actual position of the UE, wherein a resulting position estimate is a function of the first position estimate and a delta position associated to the first position estimate; and
sending, to the target AN, information indicative of the first position estimate of an actual position of the UE, so that the target AN is enabled to activate the one or the plurality of target beams based on the first position estimate,
wherein the delta position is determined based on pruning of a plurality of determined position difference values from a database that keeps the stored plurality of determined position difference values.

7. The method of claim 6, wherein the sending, to the target AN, the information indicative of the first position estimate is performed after detecting that a handover shall be performed from one or a plurality of source beams of the source AN to one or a plurality of target beams of the target AN.

8. An access node of a radio network adapted for communicating with a User Equipment (UE) over a radio interface, the access node comprising:
a receiver configured to receive, from a further access node, positioning information indicative of a first position estimate of an actual position of the UE;
processing circuitry configured to:
determine a resulting position estimate, wherein the resulting position estimate is derived from the first position estimate, wherein the processing circuitry is further configured to retrieve a delta position from a database that keeps stored a plurality of delta position information, each being associated with first position estimate; and
activate one or a plurality of target beams based on the resulting position estimate,
wherein the delta position is based on pruning of a plurality of determined position difference values from a database that keeps the stored plurality of determined position difference values.

9. An Access Node (AN) of a radio network adapted for communicating with a User Equipment (UE) over a radio interface, the AN comprising:
a receiver configured to receive, from a source AN, positioning information indicative of a first position estimate associated to an actual position of the UE;
processing circuitry configured to:
determine a second position estimate associated to the actual position of the UE; and
determine a delta position between the first position estimate and the second position estimate, wherein the processing circuitry is further configured to retrieve the delta position from a database that keeps stored a delta position associated with each first position estimate,
wherein the delta position is determined based on pruning of a plurality of determined position difference values from a database that keeps the stored plurality of determined position difference values.

10. An Access Node (AN) of a radio network adapted for communicating with a User Equipment (UE) over a radio interface, the AN comprising:
processing circuitry configured to:
determine a first position estimate of an actual position of the UE;
determine a second position estimate the actual position of the UE;
determine a delta position between the first position estimate and the second position estimate,
wherein the processing circuitry is further configured to retrieve the delta position from a database that keeps stored a delta position associated with each first position estimate, and
wherein the delta position is determined based on pruning of a plurality of determined position difference values from a database that keeps the stored plurality of determined position difference values; and
transmission circuitry configured to send, to a target AN, information indicative of the first position estimate of an actual position of the UE and information indicative of the second position estimate of an actual position of the UE, so that the target AN is enabled to activating one or a plurality of target beams in dependency of the first position estimate.

* * * * *